United States Patent [19]

Tatsumi

[11] Patent Number: 4,638,157
[45] Date of Patent: Jan. 20, 1987

[54] DETECTING APPARATUS UTILIZING LIGHT BEAMS

[75] Inventor: Hiroshi Tatsumi, Fujiidera, Japan

[73] Assignee: Kubota, Ltd., Osaka, Japan

[21] Appl. No.: 660,352

[22] Filed: Oct. 12, 1984

[30] Foreign Application Priority Data

May 11, 1984 [JP] Japan .................................. 59-95401

[51] Int. Cl.$^4$ ........................... H01J 3/14; H01J 5/16; H01J 40/14
[52] U.S. Cl. ................................................... 250/236
[58] Field of Search .............. 356/1, 4; 250/202, 234, 250/235, 236; 180/167, 169; 350/6.5

[56] References Cited

U.S. PATENT DOCUMENTS 3,708,668  1/1973  Tilley ................................. 180/169
4,146,327  3/1979  Harris ...................................... 356/1

*Primary Examiner*—David C. Nelms
*Assistant Examiner*—William L. Oen
*Attorney, Agent, or Firm*—Edwin E. Greigg

[57] ABSTRACT

A detecting apparatus utilizing light comprising a light beam emitter for emitting beams of light having a predetermined light path toward a plurality of retroreflectors adapted to reflect light in a direction from which the light strikes thereupon, and a receiver to receive the beams of light reflected by the retroreflectors, the light beam emitter including a light source and a mirror for detecting the beams of light received from the light source toward the retroreflectors, characterized in that the apparatus further comprises a drive to rotate the mirror about an axis normal to an optical axis of the beams of light extending from the light source to the mirror and also normal to directions in which the beams of light proceed from the mirror to the retroreflectors, and that slits are defined at outlets from which the beams of light proceed toward the retroreflectors, the slits having a shape to permit the beams of light to diffuse vertically.

10 Claims, 21 Drawing Figures

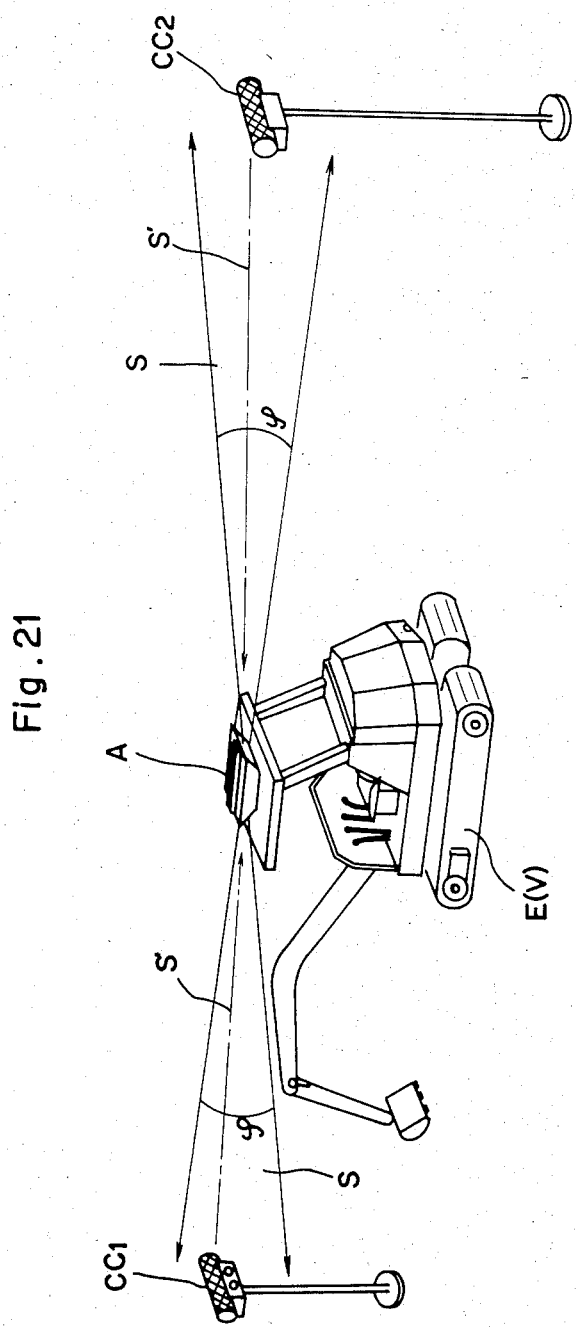

DETECTING APPARATUS UTILIZING LIGHT BEAMS

BACKGROUND OF THE INVENTION

This invention relates to a detecting apparatus utilizing light beams for automatically guiding a vehicle along a predetermined track. Such a vehicle may be, for example, an automotive working vehicle or an unmanned conveyor cart in a factory. The detecting apparatus comprises means to emit beams of light toward a plurality of retroreflectors arranged along the track and adapted to reflect light in a direction from which the light strikes thereupon, and means to receive the beams of light reflected by the retroreflectors.

With this type of detecting apparatus beams of light per se are diffused by optical means, and the beams are emitted only in one direction. Such known apparatus have disadvantages as noted below and the improvement has been set forth.

Since beams of light per se are diffused by optical means such as a lens, the beams emitted toward the retroreflectors lose intensity and it is therefore necessary to provide a light source capable of emitting relatively strong beams of light. Where a plurality of retroreflectors are arranged in a row in a direction of directing the light beams, the reflected light beams returning from the retroreflectors are received simultaneously making it difficult to determine whether the received light beams are those reflected by the plurality of retroreflectors or by one of the retroreflectors. This has a disadvantage of requiring a complicated construction. Furthermore, for structural reasons the beams of light are not permitted to diffuse to a great extent, which has the disadvantage of requiring many retroreflectors arranged on the track even where a vehicle is guided along a straight track between two predetermined points. It is difficult to guide the vehicle along the tract if retroreflectors are arranged at wide intervals.

As shown in FIG. 20 of the accompanying drawings, the known detecting apparatus is prone to an error $\Delta\theta$ in a detected angle of light reception in case the beams of light emitted from the apparatus diffuse in the horizontal direction including a direction (angle) to be detected. There is an inconvenience that this error greatly varies with variations in the distance between the detecting apparatus and retroreflectors CC.

In order to minimize the unnecessary horizontal diffusion of the beams of light emitted from the detecting apparatus, the conventional apparatus often employs means to emit laser beams which do not diffuse to a great extent or a plurality of lenses to prevent the diffusion, which results in a complicated and costly construction.

SUMMARY OF THE INVENTION

This invention has been made having regard to the state of the art noted above. A primary object of the invention, therefore, is to provide a detecting apparatus utilizing light beams comprising means to emit beams of light simultaneously in different directions such as forwardly and rearwardly of a vehicle toward retroreflectors, the beams of light having a predetermined vertical diffusion but hardly any horizontal diffusion.

Another object of this invention is to provide a detecting apparatus utilizing light beams comprising means to detect with high precision a detection from which beams of light reflected by retroreflectors are received even if the beams of light have a slight horizontal diffusion.

In order to achieve the primary object, a detecting apparatus utilizing light beams according to this invention comprises a mirror for totally reflecting beams of light in directions normal to an optical axis of the beams of light emitted by a light source to transmit the beams of light having a predetermined vertical diffusion, and means to rotate the mirror about an axis normal to the directions in which the beams of light are reflected, whereby rotations of the mirror permit the beams of light to diffuse and scan in the vertical direction including the optical axis and in both opposite directions in which the beams of light are reflected by the mirror (for example, forwardly and rearwardly of the vehicle). The apparatus also comprises means to receive beams of light returning from retroreflectors.

In order to achieve the second object, a detecting apparatus utilizing light beams according to this invention comprises means to condense light disposed on paths of the returning beams of light such that the light receiving means is located at a focal point of the condensing means.

Thus, according to this invention, the beams of light emitted by the light source are caused by non-optical means or mechanical means to diffuse to a predetermined extent and to travel in different directions. Therefore, although the beams of light are transmitted in high speed alternation in the two different directions (for example, forwardly and rearwardly), the intensity of the light beams do not lessen below what is governed by the reflecting efficiency of the mirror. As a result, the light source employed in this invention may have small power to emit beams of light equalling those in the prior art in respect of intensity.

Furthermore, since the beams of light reflected by a plurality of retroreflectors are not received simultaneously, it is possible to determine from which retroreflector the received beams of light have returned.

As shown in FIG. 19, the invention provides condensing means 29a comprising, for example, a convex lens on a path of returning beams of light, a light receiver 4 being located at a focal point of the condensing means 29a. Thus the light receiver 4 receives only those beams of light returning from a retroreflector CC1 or CC2 which travel along an optical axis extending between the condensing means 29a and the light receiver 4, that is to say only those beams of light returning from a certain direction.

Therefore, because the light receiver receives only those beams of light returning from a certain direction, a direction in which the retroreflector lies is detected with high precision. Even if the beams of light emitted by the apparatus have a slight horizontal diffusion, this does not affect the detecting precision.

In other words, the condensing means is provided with a choice for condensing light with respect to the direction and more particularly the condensing means does not condense light in the vertical direction but condenses light in the horizontal direction only.

BRIEF DESCRIPTION OF THE DRAWINGS

The invention will particularly be described with reference to the accompanying drawings, in which:

FIG. 21 is a side view of the apparatus of FIG. 13 as mounted on an excavator.

DETAILED DESCRIPTION OF THE PREFERRED EMBODIMENTS

Figure 1:
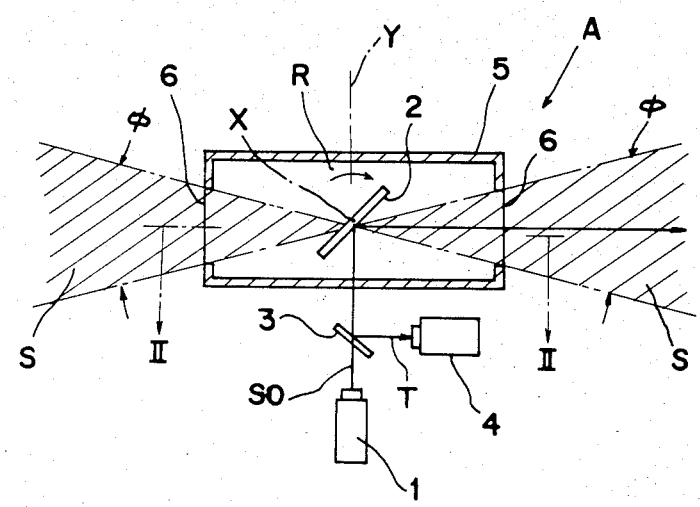
FIG. 1 is a view in vertical section of a detecting apparatus utilizing light beams according to a first embodiment of this invention.
Figure 2:
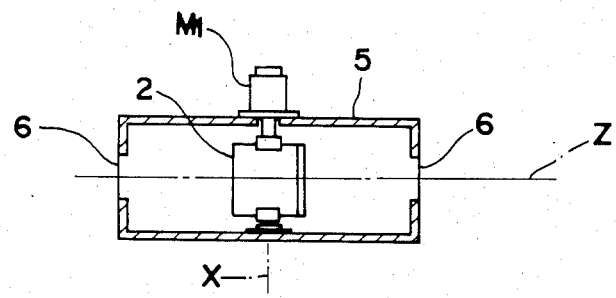
FIG. 2 is a sectional view taken on line II—II of FIG. 1.

Referring to FIGS. 1 and 2, a detecting apparatus A utilizing light beams according to a first embodiment of this invention comprises a laser emitter 1 acting as a light source and emitting light beams So having an optical axis Y, and a mirror 2 disposed on the optical axis Y for reflecting the light beams So totally in predetermined directions Z. The mirror 2 is continuously rotated, as shown by an arrow R, by a motor M1 about an axis X which is normal to the optical axis Y and the predetermined directions Z. The apparatus further comprises a 50% partially reflective mirror (or a mirror that transmits light beams traveling in one or forward direction and reflects light beams traveling in the other or backward direction) 3 disposed on the optical axis Y between the laser emitter 1 and the rotating mirror 2. Thus the light beams So pass through the mirror 3 and scan the ranges having a predetermined diverging angle $\emptyset$ in both of the predetermined directions Z, namely at righthand and lefthand sides in the drawings. The light beams reflected by retroreflectors CC1 and CC2 (FIG. 6) are reflected by the mirror 2 and mirror 3 to proceed to a light receiver 4 as shown by an arrow T. The mirror 2 and the motor M1 are supported by a frame 5 having slits 6 at respective sides thereof, the slits 6 corresponding to the predetermined diverging angle $\emptyset$.

Accordingly, by continuously rotating the mirror 2 by means of the motor M1, the light beams So carry out high-speed scanning alternately in both of the predetermined right and left directions over the ranges having the vertical angle $\emptyset$ determined by the slits 6 defined in the frame 5. The light beams reflected by the retroreflectors CC1 and CC2 during the scanning action and returning to the frame 5 are received by the single light receiver 4 by way of the mirror 3.

Since the detecting apparatus includes no other moving members than the mirror 2, the entire construction is simple and scanning by the light beams So is carried out at high speed.

The single light receiver 4 needs no large light receiving surface since the light beams reflected by the retrorefelctors return along the same optical axis as when they are sent forth. The directions in which the retroreflectors CC1 and CC2 are located and from which direction, right or left, the light beams are received are detected with high precision simply by detecting an angle of rotation of the mirror 2, that is to say an angle of rotation of the motor M1, at times of light beam reception.

The light beams So are automatically and alternately sent forth in the two opposite directions by 90 degree rotations of the mirror 2 about the axis X, which directions are symmetric about the axis X, and therefore no error occurs.

A modified detecting apparatus will now be described with reference to FIG. 3. In addition to the structural features of the described apparatus as shown in FIGS. 1 and 2, this modification has a mirror 2 rotatable also about the optical axis Y to permit the light beams S leaving the slits 6 to vary horizontally.

Figure 3:
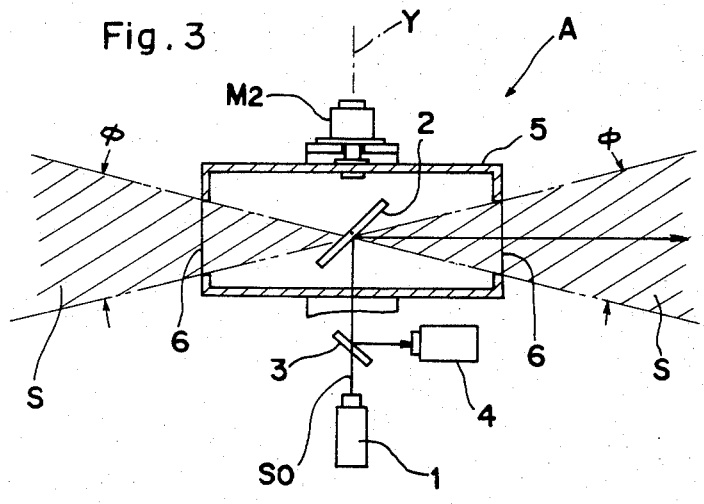
FIG. 3 is a view in vertical section of a modified detecting apparatus.

More particularly, as shown in FIG. 3, the frame 5 is adapted to be rotatable by such means as a motor M2 about the optical axis Y, whereby the light beams emitted by the fixed light source 1 are variable on a horizontal plane.

Therefore, the retroreflectors CC1 and CC2 may readily be within the light beam when, for example, a deviation occurs in the positional relationship between the retrorefelctors CC1 and CC2 and the detecting apparatus A as a vehicle carrying the detecting apparatus A travels. This permits the vehicle V to be automatically brought into a proper traveling direction by detecting an angle or rotation of the motor M2 to detect the deviation.

Figure 4:
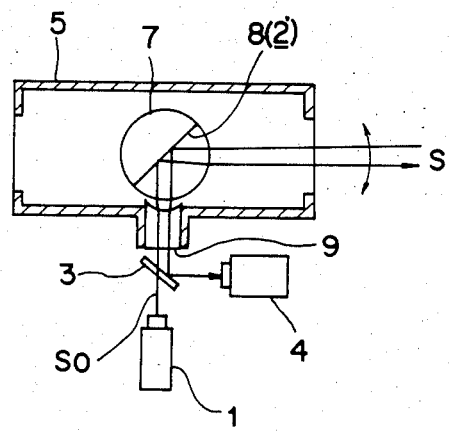
FIG. 4 is a view in vertical section showing another example of reflecting mirror.
Figure 5:
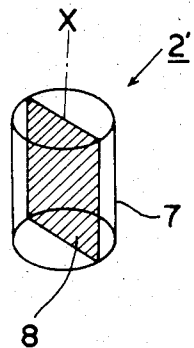
FIG. 5 is an enlarged perspective view of the reflecting mirror of FIG. 4.

A further modification of the detecting apparatus of FIGS. 1 to 3 will be described with reference to FIGS. 4 and 5. The modification consists in a mirror 2' rotated by the motor M1. This mirror 2' comprises a transparent cylindrical member 7 bisected longitudinally along its center parallel to the axis X and joined together with a total reflection member 8 inserted between or coated on the dividing faces. The light beams So emitted by the laser emitter 1 strike upon the mirror 2' through peripheral surfaces of the cylindrical member 7, at which time the cylindrical member 7 acts as a cylindrical lens to cause the light beams So to diffuse to an unnecessary degree. In order to check this diffusion a compensating lens 9 is provided on the optical axis Y as shown in FIG. 4.

Compared with the mirror 2 shown in FIGS. 1 to 3, the mirror 2' is rotatable more speedily and in a stable manner with less air resistance acting on its rotations and greater inertia. This permits the light beams So to carry out the scanning at greater speed. Since the reflection member 8 of the mirror 2' has a small, negligible thickness, there occurs no difference between the scanning angles $\emptyset$ of the light beams So leaving the right and left slits 6.

Although not shown in the drawings, the mirror 2 or 2' in the apparatus of FIGS. 1 to 3 may be oscillatable back and forth about the axis X instead of being continuously rotatable by means of the motor M1 to permit the light beams So to do the scanning. Furthermore, the mirror 2 and 2' may have the reflection surfaces on both sides rather than only one side. This has the advantages of substantially doubling the scanning speed in the case of the mirror being continuously rotated and reducing an angle of oscillation in the case of the mirror being oscillated.

Figure 6:
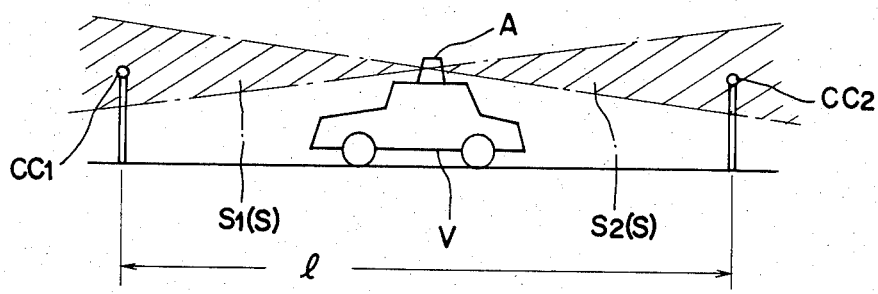
FIG. 6 is a side view showing an application of this invention.

A method of guiding the vehicle V will be described next, which method utilizes the described detecting apparatus A. As shown in FIG. 6, the vehicle carries the detecting apparatus utilizing light beams A, and the retrorefelctors CC1 and CC2 which are known as corner cubes are disposed at respective ends of a range of movement l of the vehicle V details of the retroreflectors CC1 and CC2 being particularly described later. The detecting apparatus A on the vehicle V emits light beams S having a vertical diffusion forwardly and rearwardly of the vehicle V. The light beams emitted forwardly are referenced S1 and those emitted rearwardly are referenced S2. The vehicle V is guided to travel along a straight line extending between the two corner cubes CC1 and CC2 by automatically adjusting the direction in which the vehicle V advances so that the light beams reflected by the corner cubes CC1 and CC2 are received substantially simultaneously.

Figure 7:
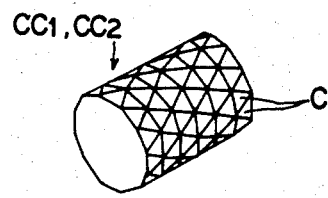
FIG. 7 is a perspective view of an example of a retroreflector.

As shown in FIG. 7, each of the corner cubes acting as the retroreflectors CC1 and CC2 includes a plurality of reflectors C with planes of incidence arranged adjacent one another, each reflector C having the property to reflect light in the direction from which the light strikes thereupon, regardless of the direction, when the light strikes from a certain range of directions. These reflectors C are arranged on a cylindrical periphery such that the planes of incidence are at an angle less than a critical angle for reflecting the light in the direction from which it strikes thereupon. Thus the cylindrical periphery is capable of reflecting the light in the direction, whichever direction, from which the light strikes thereon.

Figure 12:
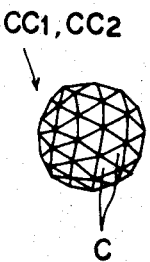
FIG. 12 is a view of another example of a retroreflector.

FIG. 12 shows another example of corner cube which differs from the corner cube of FIG. 7. This corner cube has a near-spherical shape or is a polyhedron and a plurality of unit reflectors C are arranged over the surface thereof. Such a spherical reflecting surface is capable of reflecting light in the direction from which it strikes thereupon, and this direction may be any direction over 360 degrees, thereby permitting free choice as regards conditions for its installation.

The corner cubes as described above need not include the reflecting surface over its entire cylindrical or spherical surface. The reflecting surface may just be sufficient to serve the purpose and, for example, may be semispherical.

Figure 8:
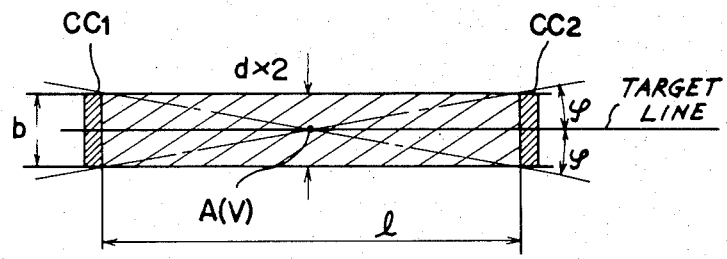
FIG. 8 is a view illustrating a straight movement guiding method.

How to use the apparatus of this invention will be described hereinafter. Referring to FIG. 8, the corner cubes CC1 and CC2 as shown in FIG. 7 and having a length b are provided at respective ends of a range of movement l such that the cylindrical peripheries or reflecting surface thereof are opposed to each other and a line extending between centers of the corner tubes CC1 and CC2 corresponds to a target track line along which a vehicle is guided. A half d of the reflecting surface b of each corner cube constitutes a tolerance limit with respect to the target line. In other words, the light beams S1 and S2 emitted without diffusing horizontally by the detecting apparatus A or the vehicle V are all reflected by the corner cubes CC1 and CC2 and returned to the detecting apparatus A or the vehicle V when the beams S1 and S2 are within the predetermined angle $\pm\theta$ to the corner cubes CC1 and CC2. This state is regarded as a state in which the vehicle is traveling along the target line, and any deviation therefrom is adjusted.

Figure 9:
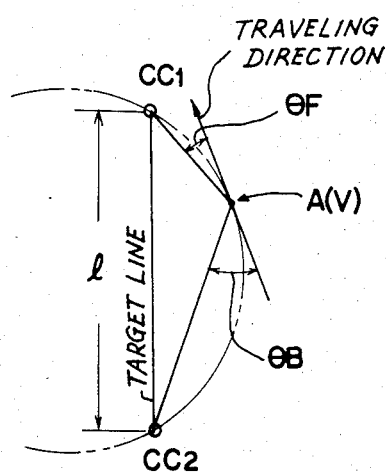
FIG. 9 is a view illustrating a position detecting method.
Figure 10:
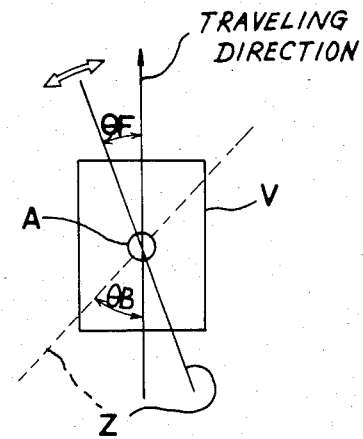
FIG. 10 is a view illustrating a moving direction control.

Next, a method is described hereinafter of detecting any significant deviation of the vehicle V from the target line extending between the two corner cubes CC1 and CC2 by using the detecting apparatus A wherein the light beams are rotatable also about the optical axis Y as shown in FIG. 3. Referring to FIG. 9, this method requires a condition that the distance l between the two corner cubes CC1 and CC2 and a distance between the vehicle V and one of the corner cubes CC1 and CC2 are known, or distances between the vehicle V and the respective corner cubes CC1 and CC2 are known. In other words, where lengths of any two sides of a triangle defined by the vehicle V and the two corner cubes CC1 and CC2 are known, the position and moving direction of the vehicle V can be detected by detecting angles of rotation $\theta F$ and $\theta B$ about the optical axis Y to the traveling direction of the vehicle V at times of reception of the light beams reflected by the two corner cubes CC1 and CC2 as seen in FIG. 10.

Figure 11:
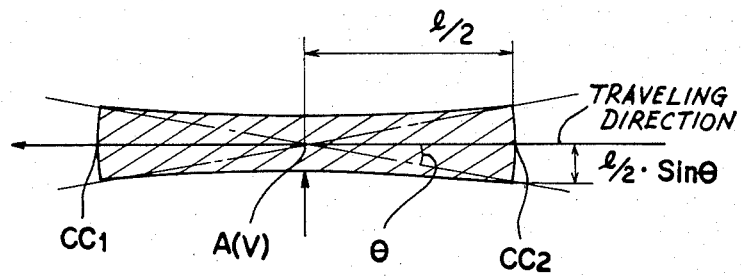
FIG. 11 is a view illustrating another straight movement guiding method.

FIG. 11 is a view illustrating another method of guiding the vehicle V to travel straight between the two corner cubes CC1 and CC2 shown in FIGS. 6 to 8. This drawing shows a tolerance limit of the guiding range with respect to the target line where the light beams emitted by the detecting apparatus A both forwardly and rearwardly of the vehicle V diffuse horizontally, both right and left, by a predetermined degress $\pm\theta$ to the vehicle V. A maximum distance of deviation from the target line is $1/2.\sin\theta$.

A second embodiment of this invention will be described hereinafter with reference to FIGS. 13 to 21.

Figure 13:
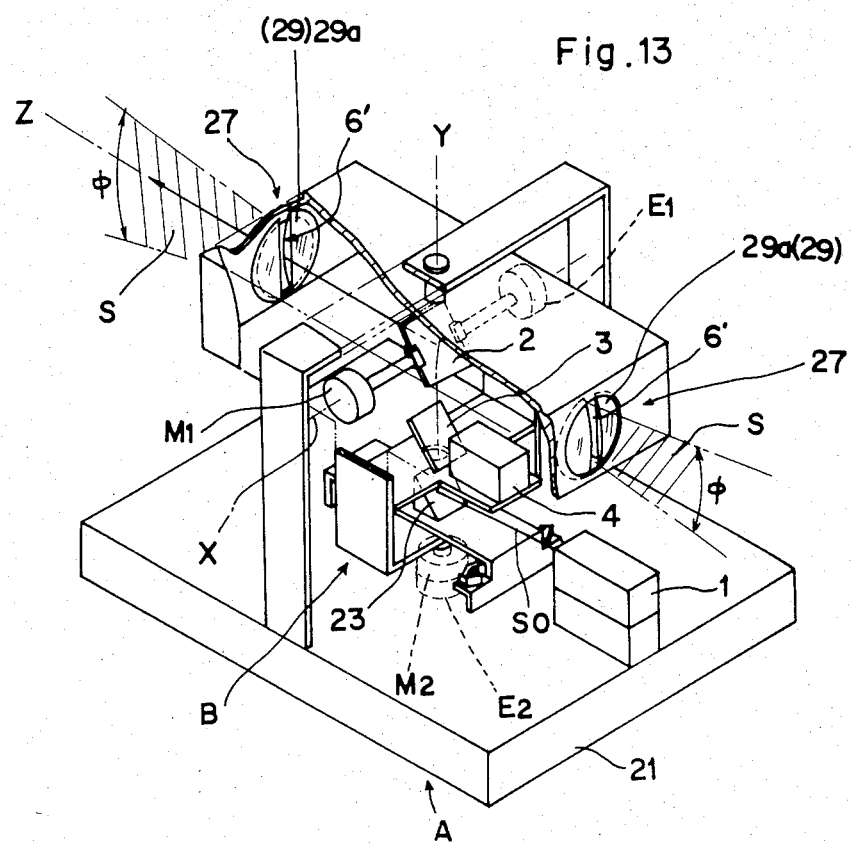
FIG. 13 is a partly broken away perspective view of a detecting apparatus utilizing light beams according to a second embodiment of the invention.
Figure 14:
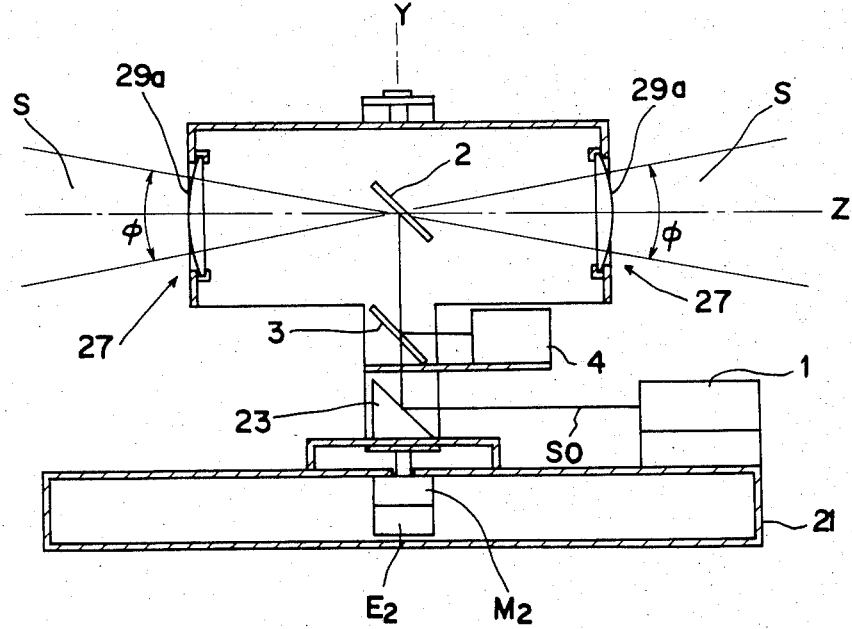
FIG. 14 is a view in vertical section of a principal portion of the detecting apparatus of FIG. 13.

As shown in FIGS. 13 and 14, a light source or laser emitter 1 mounted on a frame 21 emits beams of light So which are reflected by a 45 degree reflecting mirror 23 to travel in a vertical direction Y relative to the frame 21. A mirror 2 is mounted to be rotatable by means of a motor M1 about a horizontal axis X to reflect the light beams traveling in the vertical direction to travel horizontally again. The mirror 2 is rotatable also about a vertical axis Y by means of a motor M2. Thus, the light beams S scanning in two opposite directions Z, the righthand and lefthand sides in FIGS. 13 and 14, which are normal to the horizontal axis X, have a predetermined vertical angle of diffusion $\emptyset$. The mirror 2 and the two motors M1 and M2 constitute a scanning device B. A 50% reflective mirror 3 is provided on the optical axis Y between the reflecting mirror 23 and the rotary mirror 2. The light beams S emitted in the two opposite directions Z are reflected by retroreflectors CC1 and CC2 such as shown in FIG. 21 and return by way of the mirror 2 and the mirror 3 to be received by a single light receiver 4. Thus the detecting apparatus A causes the light beams having the predetermined angle of diffusion $\emptyset$ to scan in the horizontal direction.

In use of this apparatus, the rotary mirror 2 is continuously rotated by the motor M1 to transmit the light beams through slits 6' defined in light emitting faces 27 of the scanning device B. A vehicle is guided to travel in a proper direction by detecting directions from which the reflected light beams are received or directions in which the retroreflectors CC1 and CC2 are present in relation to the detecting apparatus A, which detection is based on detection of an angle of rotation by encoders E1 and E2 on the axes X and Y at times of reception of the light beams by the light receiver 4.

Light condensing means 29 will be described next. The apparatus of FIGS. 13 and 14 includes light condensing means 29 for the light receiver 4 which are in the form of vertically bisected convex lenses 29a, and the light receiver 4 is located at a focal point thereof. In other words, the slits 6' are defined by the convex lenses 29a, and the latter prevent the light beams S from diffusing in an unnecessary direction (i.e. horizontal direction).

Figure 16:
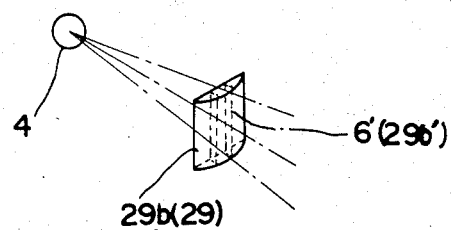
FIG. 16 is a perspective view of a further example of condensing means.
Figure 19:
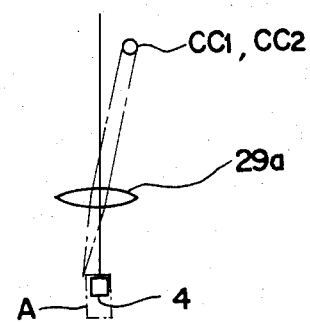
FIG. 19 is a view illustrating a principle of this invention.
Figure 20:
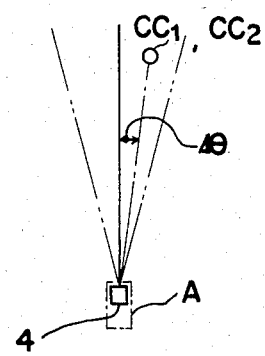
FIG. 20 is a view illustrating the prior art.

Light condensing means 29 shown in FIG. 16 comprises a cylindrical lense 29b which is alternative to the convex lens 29a having the slit. The cylindrical lens 29b has a horizontal condensing direction which is different from the diffusing direction of the light beams. Therefore, the cylindrical lens 29b is effective to condense only the light beams reflected by the retroreflector. It will be noted that a central vertical poriton of the cylindrical lens 29b corresponds to the slit 6'.

Figure 15:
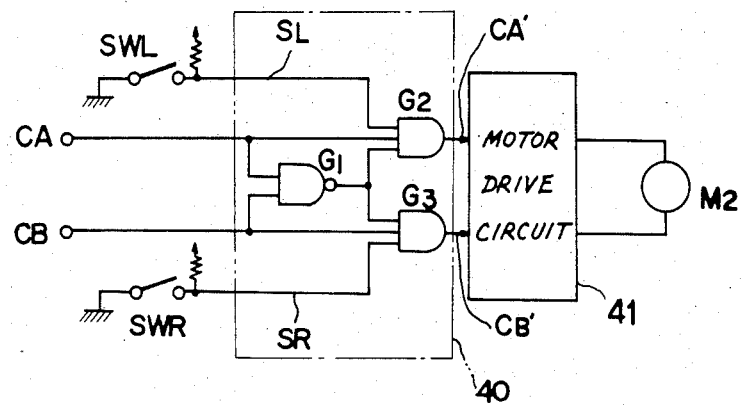
FIG. 15 is a block diagram of a motor rotation control circuit.

A control circuit for the motor M2 to rotate the rotary mirror 2 about the vertical axis Y will be described next with the reference to FIG. 15. As seen, the control circuit receives control signals CA and CB for forward rotation, backward rotation and stop of the motor M2 and rotation end detection signals SL and SR from two limit switches SWL and SWR for detecting ends of a rotational range of the motor M2. This circuit includes a rotation end detection circuit 40 comprising one NAND gate G1 and two AND gate G2 and G3. When the above signals are input to the rotation end detection circuit 40, control signals CA' and CB' to be input to a motor drive circuit 41 are obtained whereby the rotary mirror 2 is rotated within a range defined by the two limit switches SWL and SWR.

More particularly, when the limit switch SWL or SWR is closed, the instruction given by the control signal CA or CB is blacked even if the instruction is for forward or backward rotation. Thus, no further drive is transmitted to the rotary mirror 2, and only a rotation reverse to the previous rotation or standstill is made valid.

Figure 17:
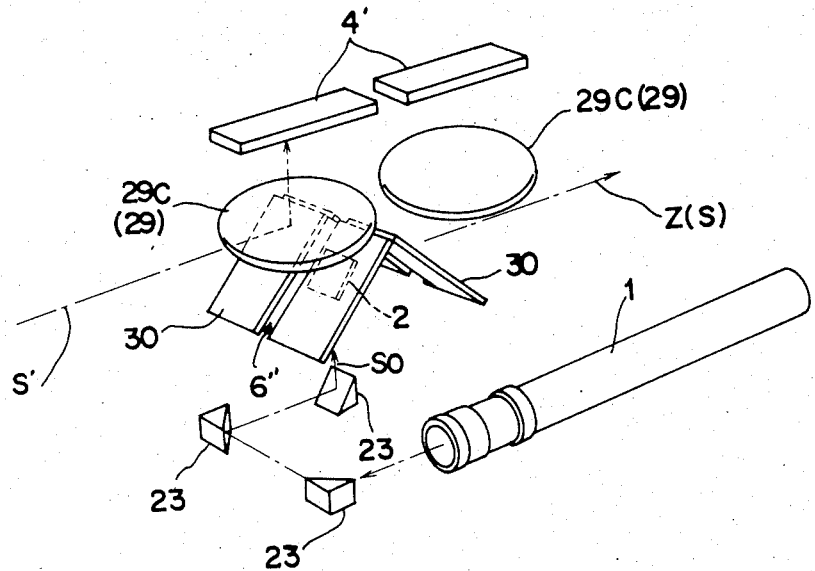
FIG. 17 is a developed perspective view of the principal portion of the detecting apparatus of FIG. 13.
Figure 18:
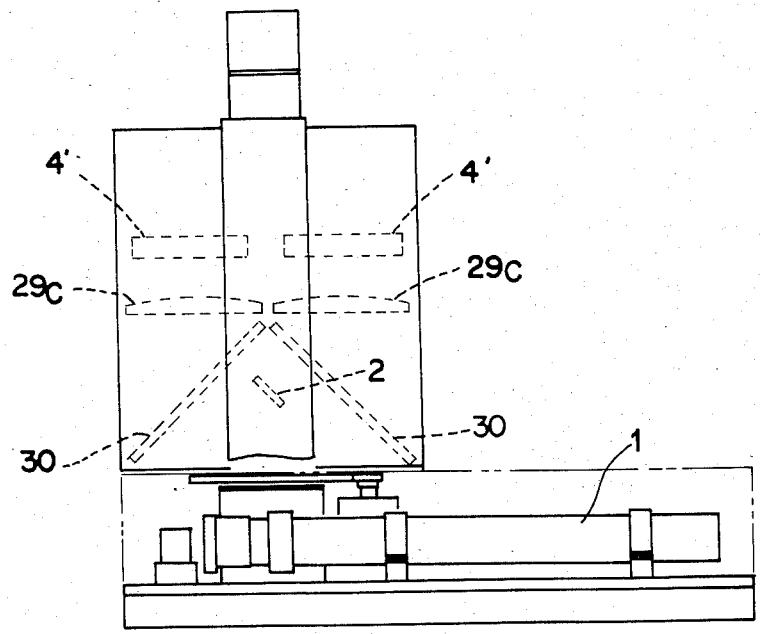
FIG. 18 is a side view of the elements of FIG. 17 as assembled.

A modification of the construction shown in FIGS. 13 to 16 will be described hereinafter. Referring to FIGS. 17 and 18, this modification is not such that the reflected beams of light returning from the retroreflectors pass through the cylindrical lenses 29b or bisected convex lenses 29a to be received by the single light receiver 4. Instead, a pair of ordinary reflecting mirrors 30 is mounted above the rotary mirror 2, each of the reflecting mirror 30 defining a slit 6" for passing horizontal light beams S transmitted from the rotary mirror 2. Furthermore, a pair of slitless convex lenses 29c and a pair of light receivers 4' are mounted above the reflecting mirrors 30. The convex lenses 29c condense the light beams reflected by retorreflectors CC1 and CC2 located in opposite directions Z, righthand and lefthand sides in FIGS. 17 and 18, in which the light beams S are emitted. In other words, the convex lenses 29c may act to condense the light beams only for the light receivers 4'.

Where a plurality of light receivers 4' are provided as above, from which direction the reflected beams are received is determined by checking which light receiver 4' received the light beam without detecting an angle of rotation of the rotary mirror 2. Since the convex lenses 29c are slitless, the construction is simple and not costly even if the plurality of convex lenses and light receivers are provided.

Since in this modification the light receivers 4 have a light receiving range wide in a longitudinal direction of the slits 6' or the scanning direction of the light beams S, there occur no light reception errors even if a light receiving position may vary due to vertical vibrations of the detecting apparatus. Further, the apparatus includes a plurality of deflecting mirrors 23, which provides for freedom in choosing a position of the laser emitter 1 and hence compactness of the entire apaparatus.

FIG. 21 shows the apparatus of FIGS. 13 to 18 as mounted on top of an excavator (or backhoe) E which is an example of vehicle V. This excavator is guided to travel straight between the retroreflectors CC1 and CC2 by detecting beams of light S' reflected by the retroreflectors CC1 and CC2.

What is claimed is:

1. An apparatus for detecting an object by utilizing a light beam comprising
   a light beam source for emitting a light beam,
   a light beam receiving means,
   reflecting means for reflecting the light beam emitted from the light beam source and directing said light beam along a light path onto a retroreflector means provided on said object to be detected for reflecting an incident light beam in a predetermined direction,
   drive means for rotating said reflecting means on an axis (X) normal to an optical axis (Y) of said light beam emitted from the light beam source, and
   slits (6) provided in light beam exit portions to determine a scanning angle by said light beam reflected by the reflecting means.

2. An apparatus as claimed in claim 1 wherein oscillating means is provided to oscillate a frame including said reflecting means and said slit, on the optical axid (Y) of the light beam emitted from the light beam source.

3. An apparatus as claimed in claim 2 wherein the reflecting means comprises a plane mirror.

4. An apparatus as claimed in claim 2 wherein said mirror includes a transparent bisected cylindrical member bisected along its axis to form divided faces and a light reflecting member inserted between said divided faces of said cylindrical member in a plane along its axis.

5. An apparatus as claimed in claim 2 further comprising a 50% partially reflective mirror provided between said light beam source and said reflecting means to permit only a light beam reflected by said retroreflector means and reflected by said reflecting means to proceed to said light beam receiving means.

6. An apparatus as claimed in claim 5 wherein each of said slits comprises a vertical gap between two pieces of a bisected convex lens disposed opposite a laser beam transmitting face opposed to one of said retroreflectors, said light receiving means being located at a focal point of said convex lens.

7. An apparatus as claimed in claim 5 wherein each of said slits comprises a central vertical portion of a cylindrical lens disposed upright opposite a laser beam transmitting face opposed to one of said retroreflectors, said light receiving means being located at a focal point of said cylindrical lens.

8. An apparatus as claimed in claim 1 wherein said slits comprise gaps between a pair of reflecting mirrors mounted above and across said reflecting means, respectively, said light receiving means being located at focal points of convex lenses mounted between said reflecting mirrors and said receiving means.

9. An apparatus as claimed in claim 2 wherein said slits comprise gaps between a pair of reflecting mirrors mounted above and across said reflecting means, respectively, said light receiving means being located at focal points of convex lenses mounted between said reflecting mirrors and said receiving means.

10. An apparatus as claimed in claim 1 in which said light beam source is a laser.

* * * * *